July 13, 1965     R. I. N. WEINGART     3,194,880

SYSTEM FOR MONITORING BUSINESS TRANSACTIONS

Filed May 3, 1961     5 Sheets-Sheet 2

INVENTOR.
RICHARD I. N. WEINGART
BY
ATTORNEYS

July 13, 1965    R. I. N. WEINGART    3,194,880
SYSTEM FOR MONITORING BUSINESS TRANSACTIONS
Filed May 3, 1961    5 Sheets-Sheet 4
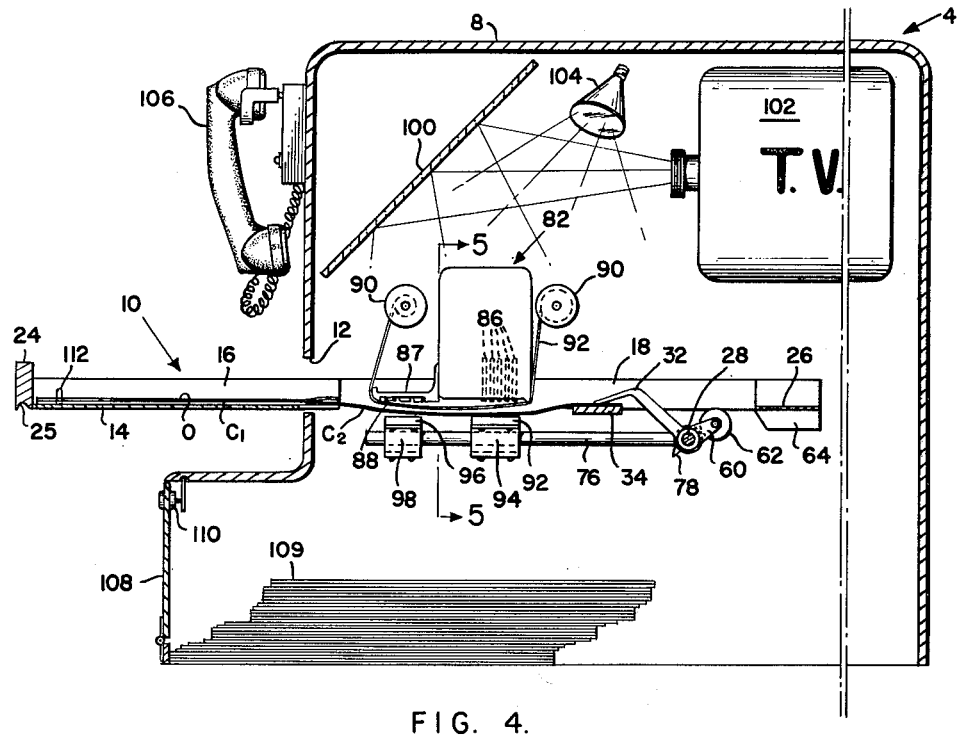
FIG. 4.
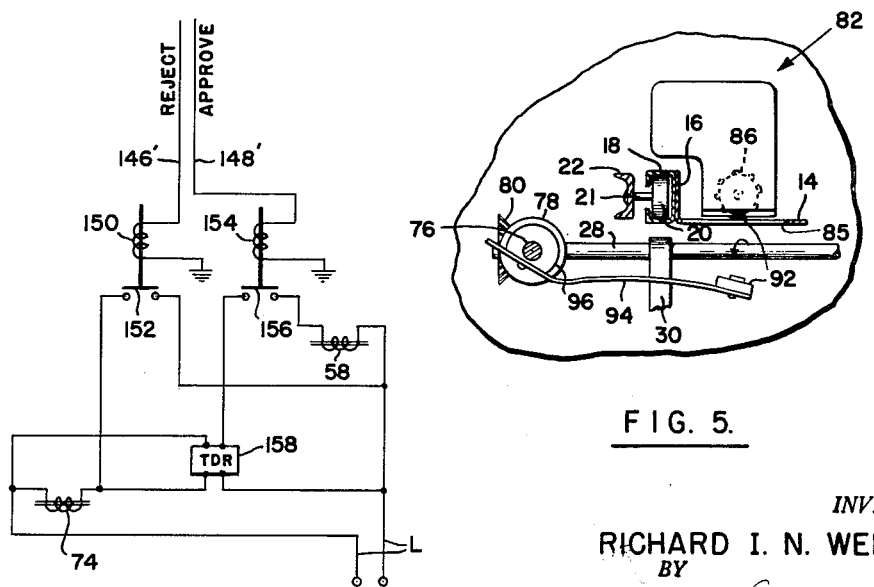
FIG. 5.
FIG. 6.
INVENTOR.
RICHARD I. N. WEINGART
BY
ATTORNEYS July 13, 1965 R. I. N. WEINGART 3,194,880
SYSTEM FOR MONITORING BUSINESS TRANSACTIONS
Filed May 3, 1961 5 Sheets-Sheet 5

INVENTOR.
RICHARD I. N. WEINGART
BY
ATTORNEYS

United States Patent Office 3,194,880
Patented July 13, 1965

3,194,880
SYSTEM FOR MONITORING BUSINESS
TRANSACTIONS
Richard I. N. Weingart, "Windward," East Bay St.,
P.O. Box 1526, Nassau, Bahamas
Filed May 3, 1961, Ser. No. 107,523
5 Claims. (Cl. 178—6)

This invention relates to systems for monitoring and recording at a central office or department transactions occuring at different sales stations or the like, and more particularly to such a system wherein closed circuit television is employed for the transmission and monitoring of data.

Although various other applications of the invention will become evident hereafter, it will be discussed primarily in connection with problems peculiar to the business of department stores. These problems fall roughly into the following groups (a) the tabulation of data for inventory control and accounting purposes, (b) the checking of credit prior to finalizing of sales transactions, (c) providing appropriate safeguards and controls over cash receipts and records to discourage irregular or fraudulent practices, and (d) the personnel and error problem, involving the need for careful checking of arithmetic, the filling out of sales slips, and the keying in of information on sales registers; and/or the employment of sales persons having training and intelligence higher than that of the average sales person.

Modern business and accounting practices have reached a point of advancement where automatic data processing equipment is relied upon heavily, there being involved coincidentally the recording of many more types of information than in the past. Such information typically is coded for processing. With the above developments, there has been a corresponding increase in the level of skill and acumen required of general sales and office personnel, whereby average workers must be replaced by higher paid persons, or problems must be tolerated which hinder keeping pace with the times by adopting more efficient business systems.

Various methods and systems of handling sales transactions have been tried—without outstanding success—to the end that the above problems might be minimized. It is common, for example, for a number of sales clerks to report each transaction to an attendant who may inquire or check on a customer's credit and operate a business machine which records particular information such as account number, sales clerk identification, price, taxes, inventory information, etc., and possibly serve also to issue a printed sales slip. While limiting the number of specially trained personnel required, this method has many disadvantages in that it is time consuming, several sales clerks often having to wait their turn while the customer is left unattended, unobserved, and possibly annoyed, at the sales counter.

The well-known pneumatic tube system for central bookkeeping and control of salves transactions, which involves carriers pneumatically propelled between stations, was adopted and thought to be satisfactory in years past, but in the stepped-up pace of modern business it ceases to be adequate. Principally, the pneumatic tube system is too slow in effecting a complete sales translation. Secondly, and in some instances of equal importance, is the problem of installing the network of tubes constituting such a system and its limitations on architectural design.

Proposals for centralized monitoring of sales transactions have been made which entail the transmission of coded data to the control center by electrical means. This can be effected by the use of pre-coded punch cards or the like, including cards for sales clerk and credit account identification and for inventory and price information, which are "read" by appropriate devices. Such systems, however, are highly complex and costly, and therefore generally are not suited to relatively small businesses.

Television has been considered for the visual monitoring of sales taking place at various stations throughout a store, but heretofore no attention has been given to appropriate safeguards for overcoming the problems outlined above. Reiterating, these involve avoiding as much as possible reliance on the sales clerk to correctly and carefully handle such matters as filling out a sales slip or otherwise recording the details of a transaction, and the problem of making irregular or fraudulent practices impossible.

It is the main object of the invention to provide a system for centrally controlling business transactions such as sales in a department store. While the description to follow will serve to fully explain the invention, what is involved briefly is as follows:

At various counters, departments or areas of the store units are provided which embody television cameras, each of such units having means for placing a complete sales slip within viewing range of the cameras. At a central accounting and auditing office a plurality of (or possibly only one) television monitors are provided, each of which comprises means for receiving and viewing a television picture of a sales slip serving as the record of a transaction at any particular sales department. According to a specific arrangement disclosed hereafter, at this department a clerk, after filling it out completely, places a sales slip in a drawer which is closed and thereby automatically locked. By means of conventional searching equipment an idle television monitor at the central office is selected, and there a trained person or "checker" views the sales slip on a television screen. This person checks the completeness and accuracy of details entered on the sales slip and records the information thereon, the latter operation possibly being effected by keying such information into an automated data processing business machine system. In the case of a credit transaction the credit standing of the customer may be checked also.

If the central office approves the transaction then, through suitable controls, there is effected at the sales department a printing on the sales slip of an appropriate approval stamp and a serial number or other suitable markings, the sales slip receiving drawer is released and a copy of the sales slip is retained in the receiver. The invention concerns in particular a novel mechanical arrangement and a form of sales slip adapted thereto as will be described hereafter. If the central office rejects a transaction then the drawer is merely released, without the printing and without retention of a copy of sales slip. An intercommunication telephone system is provided so that the matter may be discussed between the sales clerk and the central office.

Further objects and advantages will become apparent from the following description read in conjunction with the accompanying drawings, in which:

FIGURE 2 is a pictorial illustration of the equipment provided at a central television monitoring office and at a particular location of sales transactions or the like;

FIGURE 4 is a vertical cross-section through the unit, taken as indicated along lines 4—4 in FIGURE 3;

FIGURE 5 is an elevation of certain details of the mechanism, partly in cross-section as indicated at 5—5 in FIGURE 3;

FIGURE 6 is a wiring diagram of certain electrical controls;

FIGURE 8a is an illustration of a tag applied to items displayed and sold and particularly adapted for use in conjunction with the sales slip shown in FIGURE 7; and FIGURE 8b illustrates the reverse side of the tag shown in FIGURE 8a.

Figure 1:
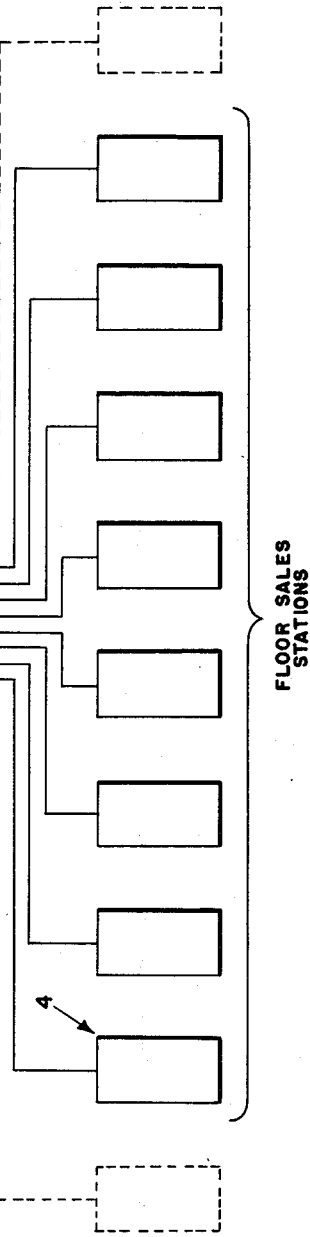
FIGURE 1 is a schematic illustration of a complete system embodying the invention.

Referring to FIGURE 1 for a further general introduction there is shown a complete business system which may be employed in, for example, a large department store. Transactions are controlled from a Central Accounting and Auditing Office, hereinafter referred to as the "central office," where trained personnel attend a plurality of television receiving means or "monitors." Sales transactions occur at a plurality of Floor Sales Stations located at different areas, departments or counters throughout the store, the details of these transactions being transmitted to the monitors 2 by television transmitting units 4. Upon a signal from any unit 4 an idle monitor 2 is connected to this particular unit through automatic controls involving Idle Monitor-Trunk Searching equipment 6. Such equipment is completely conventional and therefore this disclosure need not be burdened with a specific description thereof, suffice it to note that it is commonly used, for example, in telephone systems to connect a signalling incoming line to an idle trunk or switchboard operator. As more particularly touched upon hereafter, at the central office trained personnel or "checkers" sit before the screens of the television monitors 2, viewing sales slips or other records of transactions at various floor sales stations, and may key into an automated data processing business machine system certain information necessary for inventory control, for example. This business machine system may comprise, as illustrated in FIGURE 1, a Central Control Unit and Card Punch, from which in turn coded information in the form of punched cards is extracted for the respective purposes of Journal, Billing and Inventory. Such data processing equipment also is conventional and need not be described.

Having generally described an overall business system, there will now be described specifically one of the television transmitting units 4, reference being made to FIGURES 2 to 6. The unit 4 has an outer housing or enclosure 8 and has a drawer-like structure generally indicated at 10 (hereafter referred to as "drawer 10"), which is fitted and slidable in an opening 12 in the front thereof. The drawer 10 is comprised of a sheet metal bottom portion 14 having turned up sides 16 thereof that are secured to a pair of channel-sectioned rails 18. The drawer 10 is mounted for opening and closing sliding movements, within opening 12, by means which are more particularly shown in FIGURE 5. There it will be noted that each rail 18 is approximately C-shaped and provides a guide or track for rollers 20 which are freely rotatable on pins 21 mounted from fixed members 22 (the members 22 being omitted from FIGURE 3 for simplicity of description). A front drawer panel 24 having a finger groove 25 therein is flush with the front face of the enclosure 8 when the drawer is closed, and there are no means provided to open the drawer manually when it is in this position. A cross member 26 serves to brace the rails 18 and for other functions mentioned hereafter.

Figure 3:
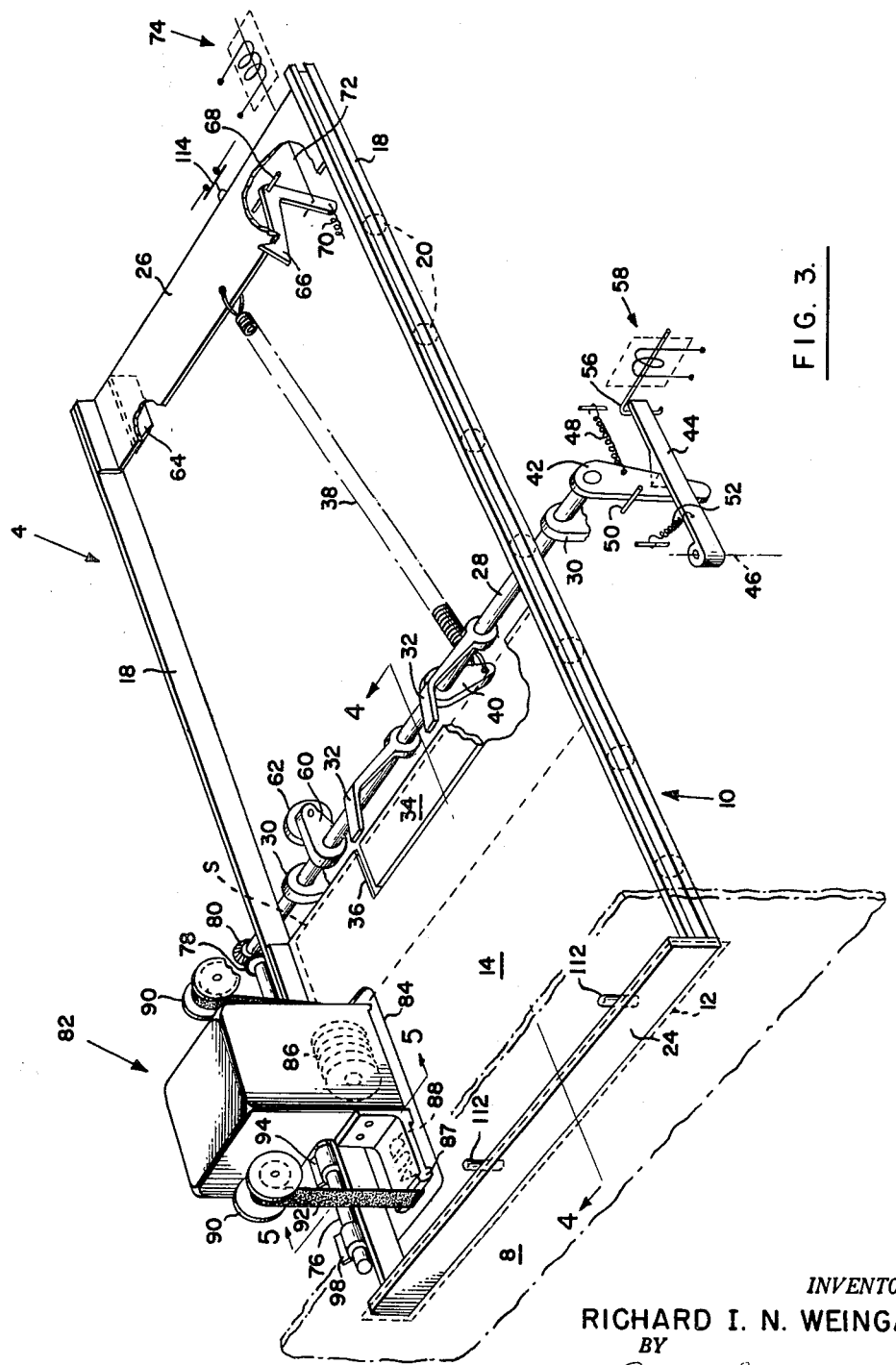
FIGURE 3 is a perspective view of the drawer structure of a television transmitting unit.

Beneath the level of drawer 10 a shaft 28 is rotatably mounted by bearings 30, and fixed thereon are a pair of upwardly extending fingers 32. In the position shown in FIGURE 3, the fingers 32 are poised above a fixed plate 34 which extends into a cutout 36 in the bottom portion 14 when the drawer 10 is in its closed position as shown in FIGURE 3. It may be noted that the upper surface of plate 34 is slightly below the level of the upper surface of bottom portion 14, whereby paper in the drawer will be carried over the plate 34 when the drawer is closed. Also fixedly mounted on shaft 28 is an arm 40, and a heavy spring 38 has its respective ends connected to arm 40 and to the cross member 26. At the one end of shaft 28 there is fixedly mounted thereon an arm 42 which is adapted to be restrained in counterclockwise rotation (as viewed in FIGURE 3) by a detent latch 44 that is hinged at 46. Arm 42 is urged in the counterclockwise direction by a light spring 48 and is limited in its clockwise rotation by a fixed stop pin 50. The latch 44 is urged into engagement with arm 42 by a spring 52. Latch 44 may be released, permitting counterclockwise rotation of arm 42 and shaft 28 under the principal influence of spring 38, by a hook 56 which is operated by the armature of a solenoid schematically illustrated at 58. Also fixedly mounted on shaft 28 is an arm 60 carrying at its free end a roller 62 that is aligned with a cam 64 on cross member 26. Cam 64 is adapted to engage roller 62 and cam the same downwardly, whereby shaft 28 is rotated clockwise to an extent sufficient to rotate the arm 42 over latch 44, when the drawer is moved as shown in FIGURE 4 toward its open far outer position. The full operation of these parts will become more evident from the description hereafter.

When the drawer is fully closed it is held in this position by a latch 66 that is pivotally mounted at 68 and urged in a clockwise direction (as viewed in FIGURE 3) by a spring 70. Latch 66 engages the front edge of cross member 26 and may be released therefrom by a link 72 which is operated by the armature of a solenoid schematically indicated at 74.

A second shaft 76 is geared to shaft 28 by a pair of bevel gears 78 and 80 keyed to these shafts respectively. It should be noted that a counterclockwise rotation of shaft 28 as viewed in FIGURE 4 will produce a clockwise rotation of shaft 76 as viewed in FIGURE 5. A printing unit is generally indicated at 82. Unit 82 embodies conventional mechanisms and therefore need not be described, it being sufficient to note that it includes serial number printing means comprising wheels 86 carrying type face numbers. The unit is set up to operate so that after each operation of the machine one or more of the wheels 86 rotate one digit to present a different serial number on the next actuation thereof. When the drawer is in the closed position illustrated in FIGURE 3 a cutout 84 in the bottom portion 14 is directly beneath the unit 82. A rigidly mounted extension 87 of unit 82 has on its underside a recess within which are affixed type face 88 spelling, in the case illustrated, an abbreviation of the word "AUDIT." As will be evident hereafter, however, any other suitable designation may be employed. Rotatably mounted spools 90 provide a supply of inked ribbon 92, which is threaded beneath the printing wheels 82 and type face 88. Spools 90 may be manually rotated periodically or may be operated automatically as desired.

A first printing head 92 is mounted on shaft 76 by a flat spring member 94 which is secured to a collar 96 fixedly mounted on this shaft. A second printing head 96 is mounted on the shaft 76 in a similar manner by a spring member 98. It will be evident that if a small extent of rotation, in a counterclockwise direction as viewed in FIGURE 5, is abruptly imparted to shaft 76 the printing heads 92 and 96 will be thrown upwardly toward the type wheels 86 and type face 88. Only a limited rotation of shaft 76 is necessary, because the momentum of printing heads 92 and 96 will carry them forward by a further amount. Thereby these printing heads strike a printing surface and are immediately withdrawn therefrom of their own accord.

A mirror 100 is fixed in position directly over drawer 10 (when the same is in its closed position), extending the full width thereof, as shown in FIGURE 4. A television camera 102 is horizontally mounted within the enclosure 8 and it will be noted that mirror 100 is so positioned angularly with respect to television camera 102 and drawer 10 that anything such as a sales slip contained in the drawer will be "seen" by the camera through the mirror. Mirror 100 is provided to make possible the horizontal mounting of camera 102, and it will be evident that the mirror is unnecessary if the camera is vertically mounted. A strong light source 104 within the enclosure 8 is directed at the area which the drawer 10 occupies when it is closed. The light source 104 may be operative continuously or if desired a switch operated by opening and closing of the drawer 10 may be provided to turn the light on and off.

Miscellaneous features include an intercommunication telephone set 106 provided on the outside of the enclosure 8. The enclosure has a door 108, having a key lock 110 at its front, to provide access to a stack 109 of sales slips or the like that have been retained and accumulated as described hereafter. Of particular concern is a pair of pins 112 which project upwardly from the bottom portion 14 of drawer 10, the function of these pins being treated presently. At the rear of the drawer there is provided a switch 114 which is adapted to be closed as the drawer approaches its finally closed position, this switch serving to signal operation of the Idle Monitor-Trunk Searching equipment 6, previously mentioned, and thereby begin a cycle of operation of the apparatus.

Figure 7:
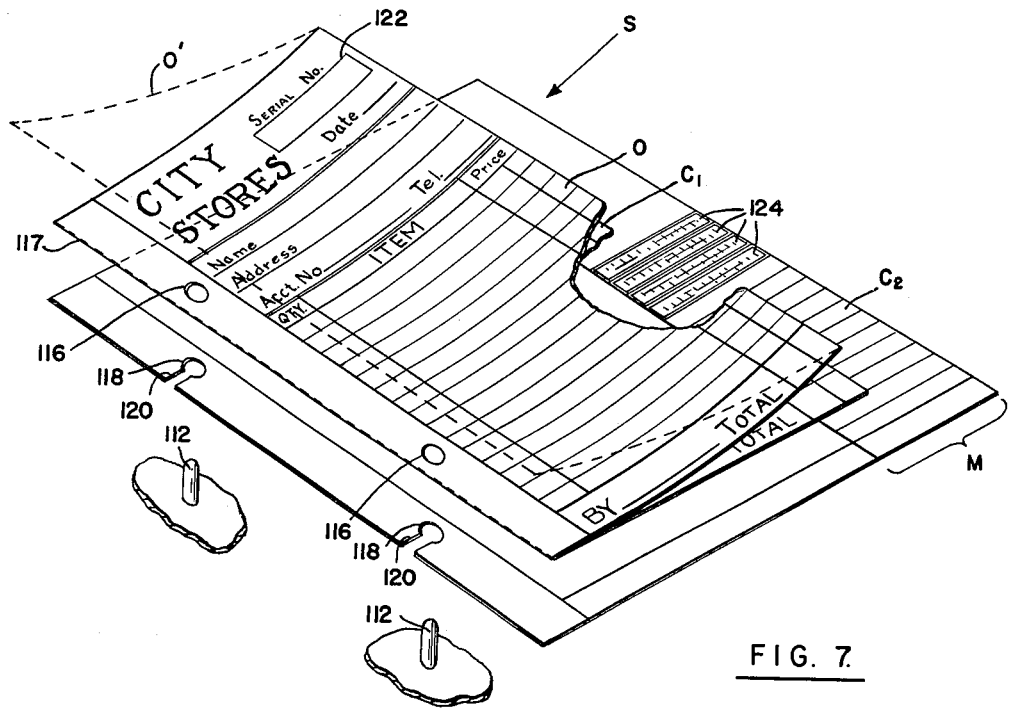
FIGURE 7 is an illustration of a novel form of sales slip used in conjunction with the equipment described herein.

Referring to FIGURE 7, there will now be described a business form which is particularly adapted for use in a system according to the invention. In the illustrated case this business form is printed as a sales slip, generally indicated at S, which consists of three portions comprising an original O, a first copy $C_1$ and a second copy $C_2$, the original O and copy $C_1$ being a single piece of paper folded and perforated along the edge 117. Original O and copies $C_1$ and $C_2$ are normally in superposed relationship and for present purposes constitute, in effect, a single business form. If desired, a fourth leaf O' may be provided as shown. A supply of these forms may be provided in a book or web fashion, the latter possibility involving transverse perforations of superposed webs as defining the upper and lower edges of each form. Round holes, spaced from edge 117, are punched in original O and copy $C_1$. In this respect copy $C_2$ is somewhat different, however, in that the margin thereof is cut away as indicated at 120 to intersect punched holes 118. Pairs of holes 116 and holes 118 have respective spacings equal to the spacing of the aforementioned pins 112, whereby the sales slip S is adapted to be positioned over these pins when it is placed in the drawer 10. Sales slip S has various columns, lines, spaces and designations which are typical of ordinary sales slips, though the particular location of the "Serial No." block 122 should be noted. When the sales slip S is positioned in drawer 10, over pins 112, and the drawer is closed the block 122 will be positioned directly under the serial number printing wheels 86.

Figures 8A, 8B:
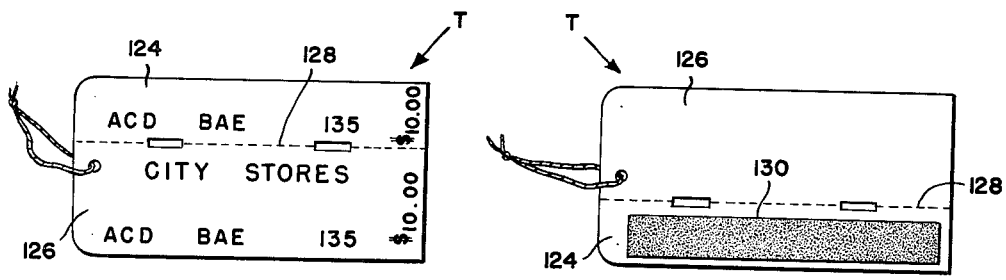

It may be noted next that the copy $C_2$ is wider than original O and copy $C_1$ to the extent of an extended marginal portion M. Extended margin M is provided for the purpose of applying thereto tabs 124 which will now be described with reference to FIGURES 8a and 8b. As shown in these figures a tab 124 is part of an overall tag T, this tag being composed of the tab 124 and a portion 126 which are separated along a perforated line 128. Tags T are intended to be attached by suitable means, a string for example, to merchandise such as garments or the like, and bear certain written information as shown in FIGURE 8a. In particular, the front face of the tag T indicates the price of the merchandise and coded information used for inventory purposes. Tab 124 is narrower than portion 126 and is different in the further respect that, as shown in FIGURE 8b, it bears on its rear face a pressure sensitive adhesive 130. Prior to the time a sales transaction is effected the adhesive 130 is, of course, suitably covered by an overlay of removable paper or the like in conventional fashion. When the tab 124 has been severed from portion 126, and the adhesive 130 has been exposed, the tab is adhered to the margin M in connection with a method of transacting a sale which will be more particularly discussed hereafter.

Figure 2:
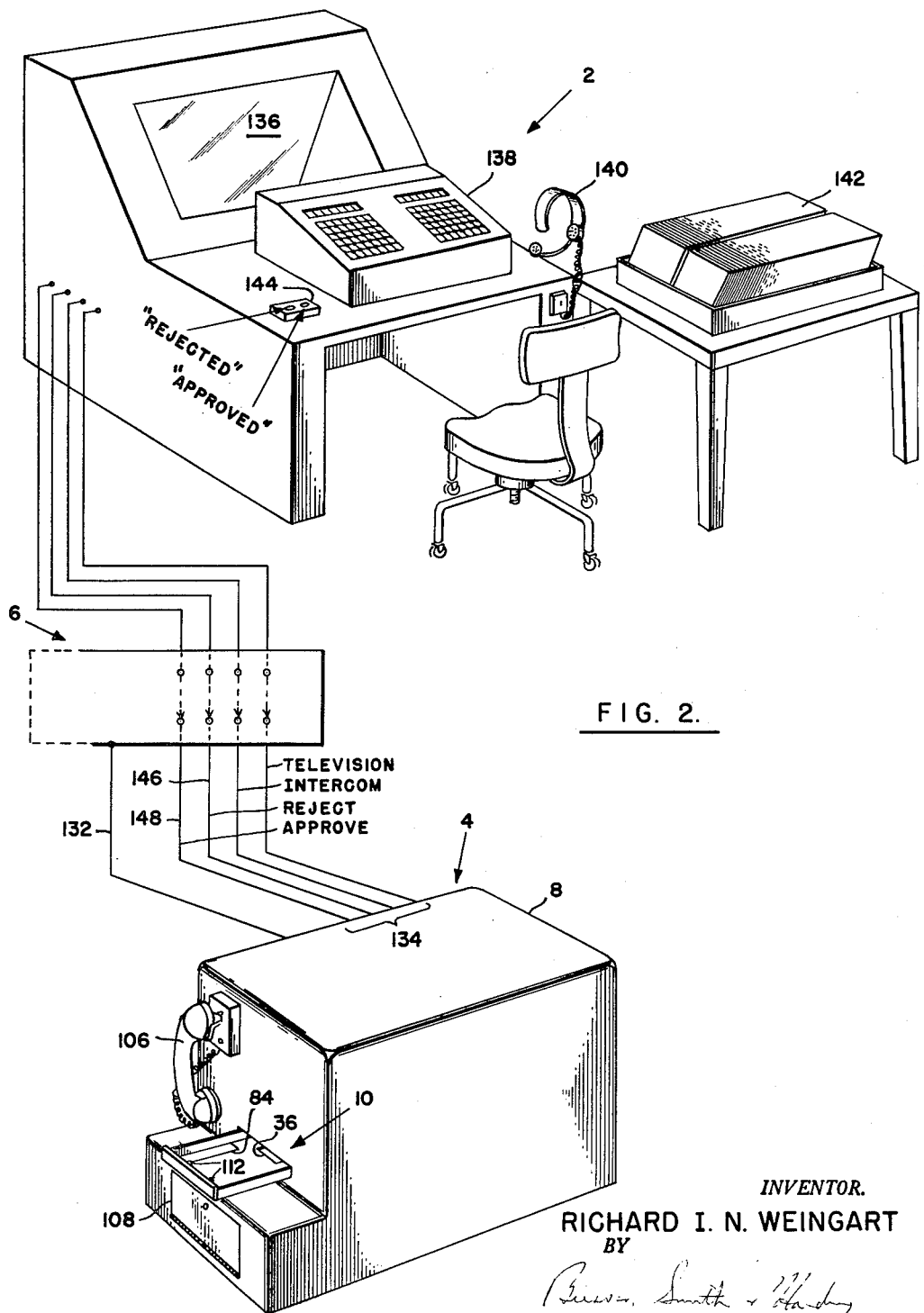

The relation of each television transmitting unit 4 to the television receivers or monitors 2, and the interconnecting controls, will be understood by reference to FIGURES 2 and 6. It is desired to effect, when a sales transaction takes place, a signalling of operation of the Idle Monitor-Trunk Searching equipment 6 to connect the unit 4 to an idle television monitor 2. This is accomplished, as diagrammed in FIGURE 2, merely by the provision of the previously mentioned switch 114 which is automatically closed upon closing of the drawer 10. Thus, by the closing of switch 114, through the line of control schematically indicated at 132 the searching equipment 6 is put in operation to connect the transmitting unit to an idle television monitor 2. It will be understood that this manner of idle trunk searching is completely conventional and well-known to persons skilled in the art.

As pictured in FIGURE 2, each television monitor may be set up as a console for the efficient performance of a trained person who is to approve or disapprove, and so forth, the transaction. After the searching equipment 6 has operated, the television monitor 2 has thereby been connected to the unit 4 by a group of lines of communication and/or control generally indicated at 134. These lines include a line, indicated "television," comprising the television power circuit cables and a line, indicated "intercom" for the intercommunication telephone. The television monitor console includes a television viewing screen 136. Although at the unit 4 the television camera 102 scans a mirror-image of the drawer 10 and its contents, it will be understood that at the television monitor the transmitted image is electrically reproduced in such a manner, as is well-known, that a correct image appears on the screen. The screen 136 may be viewed by the person sitting before it, and the keyboard 138 of an automated data processing business machine accounting system is provided in front thereof. A telephone head-set 140 is provided for oral communication between the machine operator and the sales clerk to the previously-mentioned telephone 106. Various card files such as indicated at 142 may be provided within convenient reach of the machine operator, or person viewing the screen 136, for the checking of customer credit, identification, inventory information and the like.

As an aspect of the invention there is involved a central control over operation of the mechanisms previously described with reference to FIGURES 3 to 5 particularly. That is, it is desired to control from a television monitor the operation of the latch 66, which permits opening of the drawer 10, and operation of the printing mechanism. To this end, at the television monitor two push-buttons are provided at 144, one button being labelled "rejected" and the other being labelled "approved." These buttons are connected in circuits including control lines 146 and 148 which lead to transmitting unit 4 via the switching devices of searching equipment 6. Referring specially to FIGURE 6, lines 146' and 148' are shown which are electrically energized selectively at the push-buttons 144 through the correspodning control lines 146 and 148, respectively. In line 146' there is interposed the coil 150 of a relay having a switch 152. It will be noted that the previously mentioned solenoid 74 (FIGURE 3) and switch 152 are connected in series across power lines L. In the line 148' there is provided the coil 154 of a relay having a switch 156 that is connected in series with the previously mentioned coil 58 and a time delay relay 158. Thus a circuit may be completed through solenoid 74 across lines L either by way of switch 152 or time delay relay 158. In the latter case, however, a delay in the energization of solenoid 74 following the energization of solenoid 58 is effected, for reasons which will become more apparent from the overall operation of the invention described hereafter.

The overall operation of a sytem according to the invention will now be described. Let it be assumed that at a particular sales station in a department store a customer has arranged with a sales clerk to purchase a number of articles of merchandise. Let it be assumed further that the customer desires to charge this transaction to his account, on a credit basis. On a sales slip S (FIGURE 7) the sales clerk fills in the pertinent information such as the customer's name, address, charge account number, etc., and also writes, in the appropriate spaces, the quantities, prices and items of purchases. The sales clerk also removes a tag T from each of the articles and tears from each tag the tab 124. The covering of the pressure sensitive adhesive 130 is removed, and the tab 124 is then adhered to the margin M of copy $C_2$ opposite the corresponding entry on original O, as illustrated in FIGURE 7. The sales clerk may then calculate the total price due and enter it on the sales slip. Following this the sales slip S is placed in drawer 10, with holes 116 and 118 receiving the pins 112, and the drawer is closed, whereupon latch 66 snaps over the front edge of cross member 26 to lock the drawer in closed position. Simultaneously, switch 114 is closed to signal operation of the Idle Monitor-Trunk Searching equipment 6. In the meantime, light source 104 has been on and the television camera 102 has been in a "warmed up" condition whereby it is ready to transmit. In its locked condition the drawer 10 cannot now be opened from the outside by the sales clerk and is completely beyond the sales clerk's control. The searching equipment 6 connects the transmitting unit 4 to an idle television monitor 2 at the central office through the lines 134, and on the screen 136 of the selected television monitor a trained supervisor, or "checker," see the image of the sales slip S which was placed in the drawer by the sales clerk. This, of course, follows because the television camera 102 "sees" the sales slip through mirror 104. The checker may perform a number of functions. First, a checker may investigate to determine whether the customer's credit is still under an approved status or has been blocked; in other words, whether the customer is to be extended further credit. Secondly, the sales clerk's accuracy in totalling the prices and in entering other information is rechecked. Finally, the checker may operate keyboard 138 to feed into the automated data processing business machine system all of the pertinent information desired for the purposes previously mentioned, namely, for the Journal, Billing and Inventory as examples. If, on the basis of all factors concerned, the checker approves the transaction, the "approved" button (at 144) is pushed to energize solenoid 154, which thereby closes switch 156. The closing of switch 156 effects energization of relay 158, which as previously mentioned releases the latch 44 (FIGURE 3) from arm 42. At this point it should be noted that when the drawer was closed the arm 42 was held by latch 44 in its position shown in FIGURE 3, and that as the drawer 10 was closed the spring 38 was necessarily tensioned to a considerable force. Therefore, as arm 42 is released shaft 38 is permitted to be abruptly and quite forcefully driven in a counterclockwise direction (FIGURE 4). This rotation of shaft 28 effects, first, the downward movement of fingers 32 to seize the marginal portion M (FIGURE 7) between them and the fixed member 34; second, through bevel gearings 78 and 80, hammers 92 and 96 are forcefully thrown upward against the serial number printing wheels 86 and the type face 88, respectively. The printing hammer 92, of course, effects a printing of serial number in the block 122 (FIGURE 7) and the printing hammer 96 effects the printing on the sales slip S of a stamp such as "AUD." (abbreviation for "audit") to indicate that the transaction has been approved. The drawer 10 has not yet been released and, although shaft 28 has been rotated, spring 38 still retains a considerable amount of tension. The foregoing actions were effected by the energization of solenoid 58, but as will be noted from FIGURE 6, the time delay relay 158 will effect the energization of latch-operating solenoid 74. However, the energization of solenoid 74 is delayed a length of time sufficient to allow solenoid 58 to effect the movements of fingers 32 and printing hammers 92 and 96. Following this delay, solenoid 74 is energized to release latch 66 from cross member 26, whereby the remaining tension in spring 38 pulls the drawer 10 outwardly to an open position. A significant aspect of the invention which should be noted is, that during this latter operation the fingers 32 grip the margin M of copy $C_2$, whereby it is not free to return with the drawer 10 to its outer position. Rather, the pins 112 are pulled from within holes 118 (FIGURE 7) through the openings provided by cutouts 120. The original O and copy $C_1$, however, having no such cutouts 120, are retained on pins 112 and returned with the drawer to its outer position. As the drawer is drawn from its extreme outer position by spring 38 the cam 64 engages roller 62, thereby rocking shaft 28 and fingers 32 in a clockwise direction (FIGURE 4) to release the copy $C_2$, which then drops onto the stack 109. This action of cam 64 also effects the relocking of arm 42 by latch 44 in readiness for the next cycle of operation. Suitable simple devices may be provided to insure than on each release by the latch 66 the drawer 10 will return to its fully open position, thereby to insure latching of arm 42, but this should be unnecessary if spring 38 is sufficiently strong and is constantly tensioned; then, whenever its return is uninterfered with the spring 38 will pull cam 64 into engagement with roller 62.

Upon approval of the transaction and opening of the drawer 10 the sales clerk removes the sales slip S and severs the original O from copy $C_1$. The copy $C_2$, as mentioned, has been retained at 109 within the enclosure 8. Either the original O or the copy $C_1$ may be handed to the customer and the remaining record retained by the sales clerk.

Let it be assumed next that the checker at the television monitor for one reason or another disapproves the transacion. For example, the sales clerk may have incorrectly or carelessly filled out the sales slip or it may have been found that the customer's credit has been blocked. In such case, the "rejected" button is depressed, causing, as will be seen from FIGURE 6, the energization of solenoid 150 to close switch 152. This action does not, as in the case of an "approved" transaction, involve the energization of solenoid 58, but involves only the energization of solenoid 74 to release the latch 66. Thus, absent energization of solenoid 58, the latch 44 is not released to permit operation of fingers 32 and printing unit 82. The drawer 10 then opens, but without having been printed with a serial number and an approval stamp. The cam 64, it will be noted, merely rides over the roller 62 on opening of the drawer 10 and the latched condition of arm 42 is not disturbed. The arm 42 merely remains latched, in readiness for the next cycle of operation. In certain cases of "rejected" transactions the checker may wish to discuss the matter with the sales clerk, and for such occasions the intercommunication telephone system is provided.

The advantages of the above described system should now be evident: Due to the fact that all details of the transaction entered on the sales slip are completely checked at the central office sales clerks of only average intelligence and training may be employed. A relatively small number of intelligent and highly trained personnel may be efficiently employed at the central office to monitor transactions occurring at a large number of sales stations or the like. Thus there is achieved the twofold benefit of reduction in payroll and minimizing errors in accounting. A sales transaction can be completed immediately and rapidly, and without requiring a sales clerk to wait his or her turn for approval at a central desk on the sales floor. Also, to handle a transaction it is not necessary to leave the customer unattended. These considerations, in addition to directly benefiting the store, contribute to customer goodwill. There is, of course, the additional advantage of easily providing a check on customer credit. From the standpoint of discouraging irregular or fraudulent practices, the retention of a copy of each sales slip in the receiver 4 makes impossible the changing of any details thereof after the transaction has been submitted to the central office for approval. Furthermore, because the sales clerk cannot select or otherwise predetermine the television monitor that will be selected by the searching equipment 6, and he or she normally does not even know the identity of the monitor after it has been selected, collusion between a sales clerk and a checker is prevented. Thus, both the public and the store are protected from the fraudulent practices of sales personnel. While representing a system quite different from any other now in use, this system according to the invention does not render present business accounting machines obsolete but merely provides for their operation at a central office rather than at the point of business transaction.

As previously mentioned, certain centralized business machine systems are too costly and complex for use by relatively small businesses. A system according to the invention, however, is relatively simple, for the reason that through widespread use in industry closed circuit television has now become simplified and economical. Thus a system according to the invention can be produced, installed and operated within the financial abilities of small or medium as well as large businesses.

It will be understood that various departures from the specifically disclosed embodiment of the invention may be made without departing from the scope thereof as defined by the following claims.

What is claimed is:

1. A system for monitoring transactions comprising video display means positioned at a location remote from the point of said transactions to be viewed by a supervisor, video scanning means located at said point of transaction, means for transmitting signals from said scanning means to said display means to operate the latter, means located at the point of said transactions and operable by an operator for positioning a business form with respect to said scanning means so as to be scanned thereby, means preventing access to said form by said operator after said form is so positioned, and means operable only from said remote location by said supervisor to permit subsequent removal of said form from said position by said operator.

2. A system for monitoring transactions comprising video display means positioned at a location remote from the point of said transaction to be viewed by a supervisor, video scanning means located at said point of transaction, means for transmitting signals from said scanning means to said display means to operate the latter, means located at the point of said transaction and operable by an operator for positioning a business form with respect to said scanning means so as to be scanned thereby, means positioned at the point of said transaction for separating and retaining a portion of said business form in a position not accessible to said operator, and means operatively connected to said separating and retaining means and operable only upon approval by said supervisor for actuating said separating and retaining means.

3. A system for monitoring transactions comprising video display means positioned at a location remote from the point of said transactions to be viewed by a supervisor, video scanning means located at said point of transaction, means for transmitting signals from said scanning means to said display means to operate the latter, means operable by an operator for moving a business form into a predetermined position to be scanned by said scanning means, locking means for preventing access to said form by said operator after said form is in said position, means for separating and retaining a portion of said form while said form is in said position, and means operable only upon approval by said supervisor for actuating said separating and retaining means and for releasing said locking means so as to permit removal of the remainder of said form by said operator.

4. A system for monitoring transactions occurring at a first location by a supervisor positioned at a remote location comprising means for receiving and non-removably securing a business form in a predetermined position at said first location, video scanning means positioned at said first location for scanning said form, means for transmitting a picture of said form from said scanning means to a display means located at said remote location, means for printing data on said form while said form is in said predetermined position, and control means operable only upon approval by said supervisor for actuating said printing means and for releasing said securing means.

5. A system for monitoring transactions comprising video display means positioned at a location remote from the point of said transactions, video scanning means located at the point of said transactions, means for transmitting signals from said scanning means to said display means to operate the latter, enclosure means, means for inserting a business form into said enclosure to be scanned by said scanning means, means for non-removably securing said form in said enclosure, means for separating and retaining a portion of said form in said enclosure, means for releasing said securing means so as to permit removal of a portion of said form, and means for controlling the operation of said retaining means and said releasing means only from said remote location.

References Cited by the Examiner

UNITED STATES PATENTS 3,031,076   4/62   De Claris _____ 340—149

OTHER REFERENCES

"Closed-Circuit Television Systems," RCA Service Co., 1958, pp. 18 and 19 in addenda.

"An Experimental Visual Communication System," Becker et al., Bell System Technical Journal, January 1959, vol. 38, No. 1, pp. 141–176.

DAVID G. REDINBAUGH, *Primary Examiner.*

E. JAMES SAX, *Examiner.*